United States Patent
Steele, Jr.

(10) Patent No.: US 7,613,762 B2
(45) Date of Patent: Nov. 3, 2009

(54) FLOATING POINT REMAINDER WITH EMBEDDED STATUS INFORMATION

(75) Inventor: Guy L. Steele, Jr., Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1708 days.

(21) Appl. No.: 10/035,584

(22) Filed: Dec. 28, 2001

(65) Prior Publication Data

US 2003/0009500 A1  Jan. 9, 2003

Related U.S. Application Data

(60) Provisional application No. 60/293,173, filed on May 25, 2001.

(51) Int. Cl.
G06F 7/44 (2006.01)
G06F 7/00 (2006.01)

(52) U.S. Cl. .................... 708/504; 708/200

(58) Field of Classification Search ........... 708/503, 708/500, 654, 510, 495, 498, 552, 504, 200
See application file for complete search history.

(56) References Cited

U.S. PATENT DOCUMENTS

| | | | |
|---|---|---|---|
| 3,725,649 A | 4/1973 | Deerfield | |
| 4,777,613 A * | 10/1988 | Shahan et al. | 708/510 |
| 4,788,655 A * | 11/1988 | Nakayama et al. | 708/496 |
| 4,991,131 A | 2/1991 | Yeh et al. | |
| 5,065,352 A * | 11/1991 | Nakano | 708/654 |
| 5,126,963 A | 6/1992 | Fukasawa | |
| 5,161,117 A | 11/1992 | Waggener, Jr. | |
| 5,249,149 A * | 9/1993 | Cocanougher et al. | 708/504 |
| 5,307,303 A * | 4/1994 | Briggs et al. | 708/654 |
| 5,347,481 A | 9/1994 | Williams | |
| 5,347,482 A | 9/1994 | Williams | |
| 5,357,237 A | 10/1994 | Bearden et al. | |
| 5,363,321 A | 11/1994 | Dao et al. | |
| 5,365,465 A | 11/1994 | Larson | |
| 5,481,489 A | 1/1996 | Yanagida et al. | |
| 5,570,310 A | 10/1996 | Smith | |
| 5,666,301 A | 9/1997 | Makino | |
| 5,748,516 A | 5/1998 | Goddard et al. | |
| 5,812,439 A | 9/1998 | Hansen | |
| 5,862,066 A | 1/1999 | Rossin et al. | |

(Continued)

OTHER PUBLICATIONS

Title: "Safe Treatment of Overflow and Underflow Conditions", by Robert A. Fraley & J. Stephen Walther, Hewlett-Packard Co., pp. 1-5.

(Continued)

*Primary Examiner*—Chat C Do
(74) *Attorney, Agent, or Firm*—Sonnenschein Nath & Rosenthal LLP

(57) ABSTRACT

A system for providing a floating point remainder comprises an analyzer circuit configured to determine a first status of a first floating point operand and a second status of a second floating point operand based upon data within the first floating point operand and the second floating point operand, respectively. In addition, the system comprises a results circuit coupled to the analyzer circuit. The results circuit is configured to assert a resulting floating point operand containing the remainder of the first floating point operand and the second floating point operand and a resulting status embedded within the resulting floating point operand.

37 Claims, 4 Drawing Sheets

U.S. PATENT DOCUMENTS

| | | | |
|---|---|---|---|
| 5,892,697 A | 4/1999 | Brakefield | |
| 5,931,943 A | 8/1999 | Orup | |
| 5,953,241 A | 9/1999 | Hansen et al. | |
| 5,963,461 A | 10/1999 | Gorshtein et al. | |
| 5,978,901 A | 11/1999 | Luedtke et al. | |
| 5,995,991 A | 11/1999 | Huang et al. | |
| 6,009,511 A | 12/1999 | Lynch et al. | |
| 6,049,865 A | 4/2000 | Smith | |
| 6,081,823 A | 6/2000 | Purcell et al. | |
| 6,105,047 A * | 8/2000 | Sharangpani et al. | 708/495 |
| 6,108,772 A * | 8/2000 | Sharangpani | 708/552 |
| 6,131,106 A | 10/2000 | Steele, Jr. | |
| 6,138,135 A | 10/2000 | Karp | |
| 6,151,669 A * | 11/2000 | Huck et al. | 708/495 |
| 6,189,094 B1 | 2/2001 | Hinds et al. | |
| 6,205,460 B1 | 3/2001 | Steele, Jr. | |
| 6,219,685 B1 * | 4/2001 | Story | 708/498 |
| 6,256,655 B1 | 7/2001 | Ezer et al. | |
| 6,286,023 B1 | 9/2001 | Purcell et al. | |
| 6,286,024 B1 | 9/2001 | Yano et al. | |
| 6,360,189 B1 | 3/2002 | Hinds et al. | |
| 6,393,555 B1 | 5/2002 | Meier et al. | |
| 6,490,607 B1 * | 12/2002 | Oberman | 708/620 |
| 6,571,265 B1 * | 5/2003 | Story | 708/498 |
| 6,594,681 B1 | 7/2003 | Prabhu | |
| 6,629,120 B1 | 9/2003 | Walster et al. | |
| 6,658,443 B1 | 12/2003 | Walster | |
| 6,658,444 B1 | 12/2003 | Walster et al. | |
| 6,697,832 B1 | 2/2004 | Kelley et al. | |
| 6,732,134 B1 | 5/2004 | Rosenberg et al. | |
| 6,789,098 B1 | 9/2004 | Dijkstra | |
| 2002/0194232 A1 | 12/2002 | Walster | |
| 2003/0033335 A1 | 2/2003 | Walster | |

OTHER PUBLICATIONS

Title: "Vax Floating Point: A Solid Foundation for Numerical Computation", by Mary Payne & Dileep Bhandarkar, Digital Equipment Corp., pp. 1-12.

Title: Lecture Notes on the Status of "IEEE Standard 754 for Binary Floating-Point Arithmetic", by Prof. W. Kahan, May 31, 1996, pp. 1-30.

Title: "Interval Arithmetic Specification" by Dmitri Chiriaev & G. William Walster, Draft revised May 4, 1998, pp. 1-78.

Title: "IEEE Standard for Binary Floating-Point Arithmetic IEEE Standard 754-1985," by Standards Committee of the IEEE Computer Society, The Institute of Electrical and Electronics Engineers, Inc., copyright 1985, pp. 1-14.

U.S. Appl. No. 10/028,375, filed Dec. 28, 2001, Steele, Jr.
U.S. Appl. No. 10/035,579, filed Dec. 28, 2001, Steele, Jr.
U.S. Appl. No. 10/035,580, filed Dec. 28, 2001, Steele, Jr.
U.S. Appl. No. 10/035,581, filed Dec. 28, 2001, Steele, Jr.
U.S. Appl. No. 10/035,582, filed Dec. 28, 2001, Steele, Jr.
U.S. Appl. No. 10/035,583, filed Dec. 28, 2001, Steele, Jr.
U.S. Appl. No. 10/035,585, filed Dec. 28, 2001, Steele, Jr.
U.S. Appl. No. 10/035,586, filed Dec. 28, 2001, Steele, Jr.
U.S. Appl. No. 10/035,587, filed Dec. 28, 2001, Steele, Jr.
U.S. Appl. No. 10/035,589, filed Dec. 28, 2001, Steele, Jr.
U.S. Appl. No. 10/035,595, filed Dec. 28, 2001, Steele, Jr.
U.S. Appl. No. 10/035,647, filed Dec. 28, 2001, Steele, Jr.
U.S. Appl. No. 10/035,674, filed Dec. 28, 2001, Steele, Jr.
U.S. Appl. No. 10/035,741, filed Dec. 28, 2001, Steele, Jr.
U.S. Appl. No. 10/035,746, filed Dec. 28, 2001, Steele, Jr.
U.S. Appl. No. 10/035,747, filed Dec. 28, 2001, Steele, Jr.
U.S. Appl. No. 10/036,133, filed Dec. 28, 2001, Steele, Jr.
U.S. Appl. No. 10/320,547, filed Dec. 17, 2002, Steele, Jr.
U.S. Appl. No. 10/320,450, filed Dec. 17, 2002, Steele, Jr.

* cited by examiner

| rem | -∞ | -OV | -P | -UN | -0 | +0 | +UN | +P | +OV | +∞ | NaN |
|---|---|---|---|---|---|---|---|---|---|---|---|
| NaN | (f) | (l) | (q) | (t) | (q) | (q) | (t) | (q) | (l) | (f) | (y) |
| +∞ | (a) | (g) | -P | -UN | -0 | +0 | +UN | +P | (g) | (a) | (u) |
| +OV | (b) | (h) | (m) | (r) | (m) | (m) | (r) | (m) | (h) | (b) | (v) |
| +Q | (c) | (i) | (n) | -UN | -0 | +0 | +UN | (n) | (h) | (c) | (w) |
| +UN | (d) | (j) | (o) | (o) | (o) | (o) | (o) | (o) | (i) | (d) | (x) |
| +0 | (e) | (k) | (p) | (s) | (p) | (p) | (s) | (p) | (j) | (e) | (w) |
| -0 | (e) | (k) | (p) | (s) | (p) | (p) | (s) | (p) | (j) | (e) | (w) |
| -UN | (d) | (j) | (o) | (o) | (o) | (o) | (o) | (o) | (i) | (d) | (x) |
| -Q | (c) | (i) | (n) | -UN | -0 | +0 | +UN | (n) | (h) | (c) | (w) |
| -OV | (b) | (h) | (m) | (r) | (m) | (m) | (r) | (m) | (h) | (b) | (v) |
| -∞ | (a) | (g) | -P | -UN | -0 | +0 | +UN | +P | (g) | (a) | (u) |

FLOATING POINT REMAINDER WITH EMBEDDED STATUS INFORMATION

Applicant claims the right of priority based on U.S. Provisional Patent Application No. 60/293,173 filed May 25, 2001 in the name of Guy L. Steele, Jr.

INCORPORATION BY REFERENCE

U.S. patent application Ser. No. 10/035,747, filed on even date herewith in the name of Guy L. Steele Jr. and entitled "Floating Point System That Represents Status Flag Information Within a Floating Point Operand," assigned to the assignee of the present application, is hereby incorporated by reference.

DESCRIPTION OF THE INVENTION

1. Field of the Invention

The invention relates generally to systems and methods for performing floating point operations, and more particularly to systems and methods for performing floating point remainder operations with embedded status information associated with a floating point operand.

2. Background of the Invention

Digital electronic devices, such as digital computers, calculators and other devices, perform arithmetic calculations on values in integer, or "fixed point" format, in fractional, or "floating point" format, or both. Institute of Electrical and Electronic Engineers (IEEE) Standard 754, (hereinafter "IEEE Std. 754" or "the Standard") published in 1985 and adopted by the American National Standards Institute (ANSI), defines several standard formats for expressing values in floating point format and a number of aspects regarding behavior of computation in connection therewith. In accordance with IEEE Std. 754, a representation in floating point format comprises a plurality of binary digits, or "bits," having the structure $$se_{msb} \ldots e_{lsb} f_{msb} \ldots f_{lsb}$$

where bit "s" is a sign bit indicating whether the entire value is positive or negative, bits "$e_{msb} \ldots e_{lsb}$" comprise an exponent field represent the exponent "e" in unsigned binary biased format, and bits "$f_{msb} \ldots f_{lsb}$" comprise a fraction field that represents the fractional portion "f" in unsigned binary format ("msb" represents "most significant bit" and "lsb" represents "least significant bit"). The Standard defines two general formats. A "single" format comprises thirty-two bits, while a "double" format comprises sixty-four bits. In the single format, there is one sign bit "s," eight bits "$e_7 \ldots e_0$" comprising the exponent field and twenty-three bits "$f_{22} \ldots f_0$" comprising the fraction field. In the double format, there is one sign bit "s," eleven bits "$e_{10} \ldots e_0$" comprising the exponent field and fifty-two bits "$f_{51} \ldots f_0$" comprising the fraction field.

As indicated above, the exponent field of the floating point representation "$e_{msb} \ldots e_{lsb}$" represents the exponent "E" in biased format. The biased format provides a mechanism by which the sign of the exponent is implicitly indicated. In particular, the bits "$e_{msb} \ldots e_{lsb}$" represent a binary encoded value "e" such that "e=E+bias." This allows the exponent E to extend from −126 to +127, in the eight-bit "single" format, and from −1022 to +1023 in the eleven-bit "double" format, and provides for relatively easy manipulation of the exponents in multiplication and division operations, in which the exponents are added and subtracted, respectively.

IEEE Std. 754 provides for several different formats with both the single and double formats which are generally based on the bit patterns of the bits "$e_{msb} \ldots e_{lsb}$" comprising the exponent field and the bits "$f_{msb} \ldots f_{lsb}$" comprising the fraction field. If a number is represented such that all of the bits "$e_{msb} \ldots e_{lsb}$" of the exponent field are binary ones (i.e., if the bits represent a binary-encoded value of "255" in the single format or "2047" in the double format) and all of the bits "$f_{msb} \ldots f_{lsb}$" of the fraction field are binary zeros, then the value of the number is positive or negative infinity, depending on the value of the sign bit "s." In particular, the value "v" is $v=(-1)^s \infty$, where "∞" represents the value "infinity." On the other hand, if all of the bits "$e_{msb} \ldots e_{lsb}$" of the exponent field are binary ones and if the bits "$f_{msb} \ldots f_{lsb}$" of the fraction field are not all zeros, then the value that is represented is deemed "not a number," which is abbreviated in the Standard by "NaN."

If a number has an exponent field in which the bits "$e_{msb} \ldots e_{lsb}$" are neither all binary ones nor all binary zeros (i.e., if the bits represent a binary-encoded value between 1 and 254 in the single format or between 1 and 2046 in the double format), the number is said to be in a "normalized" format. For a number in the normalized format, the value represented by the number is $v=(-1)^s 2^{e-bias}(1.|f_{msb} \ldots f_{lsb})$, where "|" represents a concatenation operation. Effectively, in the normalized format, there is an implicit most significant digit having the value "one," so that the twenty-three digits in the fraction field of the single format, or the fifty-two digits in the fraction field of the double format, will effectively represent a value having twenty-four digits or fifty-three digits of precision, respectively, where the value is less than two, but not less than one.

On the other hand, if a number has an exponent field in which the bits "$e_{msb} \ldots e_{lsb}$" are all binary zeros, representing the binary-encoded value of "zero," and a fraction field in which the bits "$f_{msb} \ldots f_{lsb}$" are not all zero, the number is said to be in a "de-normalized" format. For a number in the de-normalized format, the value represented by the number is $v=(-1)^s 2^{e-bias+1}(0.|f_{msb} \ldots f_{lsb})$. It will be appreciated that the range of values of numbers that can be expressed in the de-normalized format is disjoint from the range of values of numbers that can be expressed in the normalized format, for both the single and double formats. Finally, if a number has an exponent field in which the bits "$e_{msb} \ldots e_{lsb}$" are all binary zeros, representing the binary-encoded value of "zero," and a fraction field in which the bits $f_{msb} \ldots f_{lsb}$ are all zero, the number has the value "zero." It will be appreciated that the value "zero" may be positive zero or negative zero, depending on the value of the sign bit.

Generally, circuits or devices that perform floating point computations or operations (generally referred to as floating point units) conforming to IEEE Std. 754 are designed to generate a result in three steps:

(a) In the first step, an approximation calculation step, an approximation to the absolutely accurate mathematical result (assuming that the input operands represent the specific mathematical values as described by IEEE Std. 754) is calculated that is sufficiently precise as to allow this accurate mathematical result to be summarized. The summarized result is usually represented by a sign bit, an exponent (typically represented using more bits than are used for an exponent in the standard floating point format), and some number "N" of bits of the presumed result fraction, plus a guard bit and a sticky bit. The value of the exponent will be such that the value of the fraction generated in step (a) consists of a 1 before the binary point and a fraction after the binary point. The bits are commonly calculated so as to obtain the same result as the following conceptual procedure (which is impossible under some circumstances to carry out in practice): calculate the mathematical result to an infinite number of bits of precision in binary scientific notation, and in such a way that there is no bit position in the significand such that all bits of lesser significance are 1-bits (this restriction avoids the ambiguity between, for example, 1.100000 . . . and 1.011111 . . . as representations of the value "one-and-one-half"); let the N most significant bits of the infinite significand be used as the intermediate result significand; let the next bit of the infinite significand be the guard bit; and let the sticky bit be 0 if and only if ALL remaining bits of the infinite significand are 0-bits (in other words, the sticky bit is the logical OR of all remaining bits of the infinite fraction after the guard bit).

(b) In the second step, a rounding step, the guard bit, the sticky bit, perhaps the sign bit, and perhaps some of the bits of the presumed significand generated in step (a) are used to decide whether to alter the result of step (a). For conventional rounding modes defined by IEEE Std. 754, this is a decision as to whether to increase the magnitude of the number represented by the presumed exponent and fraction generated in step (a). Increasing the magnitude of the number is done by adding 1 to the significand in its least significant bit position, as if the significand were a binary integer. It will be appreciated that, if the significand is all 1-bits, then the magnitude of the number is "increased" by changing it to a high-order 1-bit followed by all O-bits and adding 1 to the exponent.

Regarding the rounding modes, it will be further appreciated that, (i) if the result is a positive number, and
  (a) if the decision is made to increase, effectively the decision has been made to increase the value of the result, thereby rounding the result up (i.e., towards positive infinity), but
  (b) if the decision is made not to increase, effectively the decision has been made to decrease the value of the result, thereby rounding the result down (i.e., towards negative infinity); and
(ii) if the result is a negative number, and
  (a) if the decision is made to increase, effectively the decision has been made to decrease the value of the result, thereby rounding the result down, but
  (b) if the decision is made not to increase, effectively the decision has been made to increase the value of the result, thereby rounding the result up.

(c) In the third step, a packaging step, a result is packaged into a standard floating point format. This may involve substituting a special representation, such as the representation defined for infinity or NaN if an exceptional situation (such as overflow, underflow, or an invalid operation) was detected. Alternatively, this may involve removing the leading 1-bit (if any) of the fraction, because such leading 1-bits are implicit in the standard format. As another alternative, this may involve shifting the fraction in order to construct a denormalized number. As a specific example, it is assumed that this is the step that forces the result to be a NaN if any input operand is a NaN. In this step, the decision is also made as to whether the result should be an infinity. It will be appreciated that, if the result is to be a NaN or infinity from step (b), the original result will be discarded and an appropriate representation will be provided as the result.

In addition, in the packaging step, floating point status information is generated, which is stored in a floating point status register. The floating point status information generated for a particular floating point operation includes indications, for example, as to whether (i) a particular operand is invalid for the operation to be performed ("invalid operation");
(ii) if the operation to be performed is division, the divisor is zero ("division-by-zero");
(iii) an overflow occurred during the operation ("overflow");
(iv) an underflow occurred during the operation ("underflow"); and
(v) the rounded result of the operation is not exact ("inexact").

These conditions are typically represented by flags that are stored in the floating point status register. The floating point status information can be used to dynamically control the operations in response to certain instructions, such as conditional branch, conditional move, and conditional trap instructions that may be in the instruction stream subsequent to the floating point instruction. Also, the floating point status information may enable processing of a trap sequence, which will interrupt the normal flow of program execution. In addition, the floating point status information may be used to affect certain ones of the functional unit control signals that control the rounding mode. IEEE Std. 754 also provides for accumulating floating point status information from, for example, results generated for a series or plurality of floating point operations.

IEEE Std. 754 has brought relative harmony and stability to floating point computation and architectural design of floating point units. Moreover, its design was based on some important principles, and rests on a sensible mathematical semantics that eases the job of programmers and numerical analysts. It also supports the implementation of interval arithmetic, which may prove to be preferable to simple scalar arithmetic for many tasks. Nevertheless, IEEE Std. 754 has some serious drawbacks, including:

(i) Modes (e.g., the rounding mode and traps enabled/disabled mode), flags (e.g., flags representing the status information), and traps required to implement IEEE Std. 754 introduce implicit serialization issues. Implicit serialization is essentially the need for serial control of access (read/write) to and from globally used registers, such as a floating point status register. Under IEEE Std. 754, implicit serialization may arise between (1) different concurrent floating point instructions and (2) between floating point instructions and the instructions that read and write the flags and modes. Furthermore, rounding modes may introduce implicit serialization because they are typically indicated as global state, although in some microprocessor architectures, the rounding mode is encoded as part of the instruction operation code, which will alleviate this problem to that extent. Thus, the potential for implicit serialization makes the Standard difficult to implement coherently and efficiently in today's superscalar and parallel processing architectures without loss of performance.

(ii) The implicit side effects of a procedure that can change the flags or modes can make it very difficult for compilers to perform optimizations on floating point code. As a result, compilers for most languages usually assume that every procedure call is an optimization barrier in order to be safe. This, unfortunately, may lead to further loss of performance.

(iii) Global flags, such as those that signal certain modes, make it more difficult to do instruction scheduling where the best performance is provided by interleaving instructions of unrelated computations. Thus, instructions from regions of code governed by different flag settings or different flag detection requirements cannot easily be interleaved when they must share a single set of global flag bits.

(iv) Furthermore, traps have been difficult to integrate efficiently into computing architectures and programming language designs for fine-grained control of algorithmic behavior.

Thus, there is a need for a system that avoids such problems when performing a floating point operations and, in particular, when performing a floating point remainder operation with embedded status information associated with a floating point operand.

SUMMARY OF THE INVENTION

Consistent with the current invention, a floating point remainder unit with embedded status information method and system are provided that avoid the problems associated with prior art floating point remainder systems as discussed herein above.

In one aspect, a system for providing a floating point remainder comprises an analyzer circuit configured to determine a first status of a first floating point operand and a second status of a second floating point operand based upon data within the first floating point operand and the second floating point operand respectively. In addition, the system comprises a results circuit coupled to the analyzer circuit. The results circuit is configured to assert a resulting floating point operand containing the remainder of the first floating point operand and the second floating point operand and a resulting status embedded within the resulting floating point operand.

In another aspect, a method for providing a floating point remainder comprises determining a first status of a first floating point operand and a second status of a second floating point operand based upon data within the first floating point operand and the second floating point operand respectively. In addition, the method comprises asserting a resulting floating point operand containing the remainder of the first floating point operand and the second floating point operand and a resulting status embedded within the resulting floating point operand.

In yet another aspect, a computer-readable medium on which is stored a set of instructions for providing a floating point remainder, which when executed perform stages comprising determining a first status of a first floating point operand and a second status of a second floating point operand based upon data within the first floating point operand and the second floating point operand respectively. In addition, the instruction set provides asserting a resulting floating point operand containing the remainder of the first floating point operand and the second floating point operand and a resulting status embedded within the resulting floating point operand.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings:

FIG. 3 illustrates a table useful in understanding the operations of the exemplary system of FIG. 1 consistent with an embodiment of the present invention; and FIG. 4 depicts exemplary patterns of input and output signals received and generated by a remainder decision table logic circuit used in the exemplary system of FIG. 1 consistent with an embodiment of the present invention.

DESCRIPTION OF THE EMBODIMENTS

Figure 1:
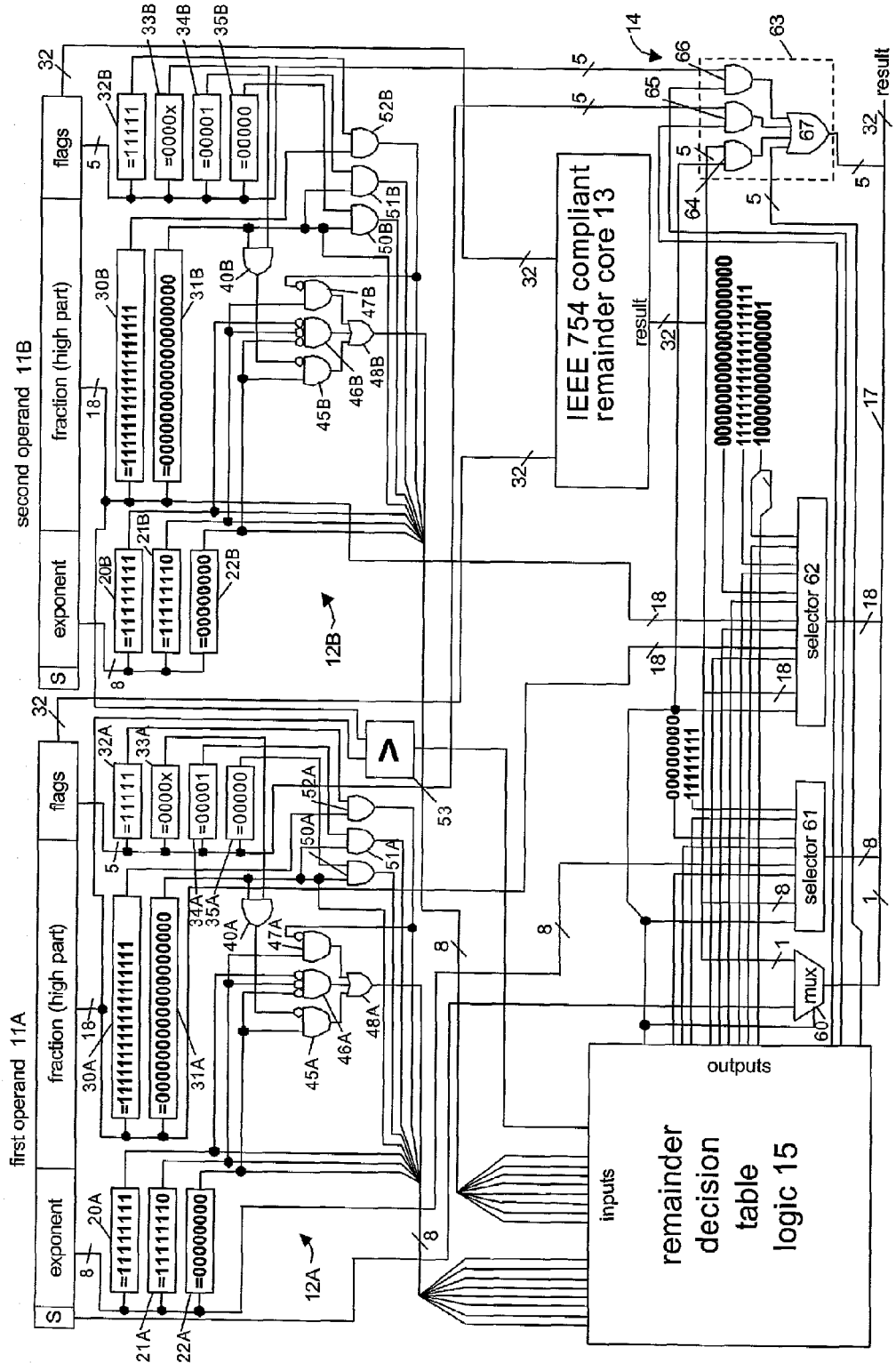
FIG. 1 is a functional block diagram of an exemplary system for providing a floating point remainder consistent with an embodiment of the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Related U.S. patent application Ser. No. 10/035,747, which has previously been incorporated by reference, describes an exemplary floating point unit in which floating point status information is encoded in the representations of the results generated thereby. The exemplary floating point unit includes a plurality of functional units, including an adder unit, a multiplier unit, a divider unit, a square root unit, a maximum/minimum unit, a comparator unit, a remainder unit, and a tester unit, all of which operate under control of functional unit control signals provided by a control unit. The present application is directed to an exemplary adder unit that can be used in floating point operations with the floating point unit described in related U.S. patent application Ser. No. 10/035,747.

FIG. 1 is a functional block diagram of an exemplary remainder unit 10 constructed in accordance with an embodiment of the invention. Generally, the remainder unit 10 receives two floating point operands and generates therefrom a result as the remainder REM(x,y)=x−(y*n), where "n" is an integer nearest the value x/y. IEEE Std. 754 allows the remainder to be negative and if x/y lies exactly halfway between two integers, then n is taken to be whichever of the two integers is even. In addition, in some cases, the remainder unit 10 generates floating point status information, with the floating point status information being encoded in and comprising part of the floating point representation of the result. Since the floating point status information comprises part of the floating point representation of the result, instead of being separate and apart from the result as in prior art remainder units, the implicit serialization that is required by maintaining the floating point status information separate and apart from the result can be obviated.

Figure 2:
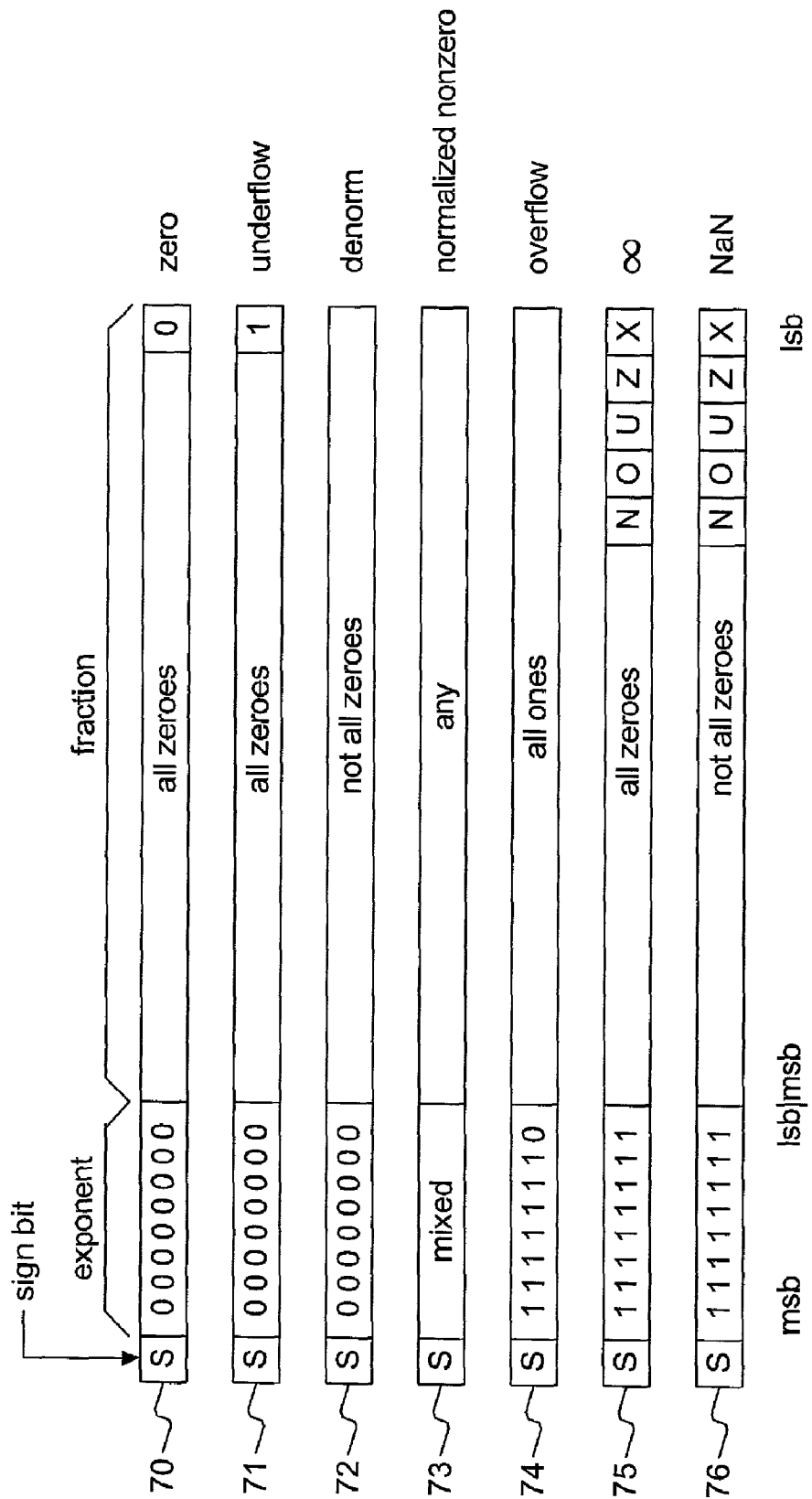
FIG. 2 illustrates exemplary formats for representations of floating point values generated by the system of FIG. 1 consistent with an embodiment of the present invention.

The remainder unit 10 encodes the floating point status information in results that are generated in certain formats. This will be illustrated in connection with FIG. 2. FIG. 2 depicts exemplary formats of floating point operands that the remainder unit 10 may receive and of results that it generates. With reference to the embodiment illustrated in FIG. 2, seven formats are depicted, including a zero format 70, an underflow format 71, a denormalized format 72, a normalized non-zero format 73, an overflow format 74, an infinity format 75 and a not-a-number (NaN) format 76. The zero format 70 is used to represent the values "zero," or, more specifically, positive or negative zero, depending on the value of "s," the sign bit.

The underflow format 71 provides a mechanism by which the remainder unit 10 can indicate that the result of a computation is an underflow. In the underflow format, the sign bit "s" indicates whether the result is positive or negative, the bits $e_{msb} \ldots e_{lsb}$ of the exponent field are all binary zeros, and the bits $f_{msb} \ldots f_{lsb+1}$ of the fraction field, except for the least significant bit, are all binary zeros. The least significant bit $f_{lsb}$ of the fraction field is a binary one.

The denormalized format 72 and normalized non-zero format 73 are used to represent finite non-zero floating point values substantially along the lines of that described above in connection with IEEE Std. 754. In both formats 72 and 73, the sign bit "s" indicates whether the result is positive or negative. The bits $e_{msb} \ldots e_{lsb}$ of the exponent field of the denormalized format 72 are all binary zeros, whereas the bits $e_{msb} \ldots e_{lsb}$ of the exponent field of the normalized non-zero format 73 are mixed ones and zeros, except that the exponent field of the normalized non-zero format 73 will not have a pattern in which bits $e_{msb} \ldots e_{lsb+1}$ are all binary ones and the least significant bit $e_{lsb}$ zero and all of the bits $f_{msb} \ldots f_{lsb}$ of the fraction field are all binary ones. In both formats 72 and 73, the bits $f_{msb} \ldots f_{lsb}$ of the fraction field are not all binary zeros.

The overflow format 74 provides a mechanism by which the remainder unit 10 can indicate that the result of a computation is an overflow. In the overflow format 74, the sign bit "s" indicates whether the result is positive or negative, the bits $e_{msb} \ldots e_{lsb+1}$ of the exponent field are all binary ones, with the least significant bit $e_{lsb}$ being zero. The bits $f_{msb} \ldots f_{lsb}$ of the fraction field are all binary ones.

The infinity format 75 provides a mechanism by which the remainder unit 10 can indicate that the result is infinite. In the infinity format 75, the sign bit "s" indicates whether the result is positive or negative, the bits $e_{msb} \ldots e_{lsb}$ of the exponent field are all binary ones, and the bits $f_{lsb} \ldots f_{lsb+5}$ of the fraction field are all binary zeros. The five least significant bits $f_{lsb+4} \ldots f_{lsb}$ of the fraction field are flags, which will be described below.

The NaN format 76 provides a mechanism by which the remainder unit 10 can indicate that the result is not a number. In the NaN format, the sign bit "s" can be any value, the bits $e_{msb} \ldots e_{lsb}$ of the exponent field are all binary ones, and the bits $f_{msb} \ldots f_{lsb+5}$ of the fraction field are not all binary zeros. The five least significant bits $f_{lsb+4} \ldots f_{lsb}$ of the fraction field are flags, which will be described below.

As noted above, in values represented in the infinity format 75 and the NaN format 76, the five low order bits $f_{lsb+4} \ldots f_{lsb}$ of the fraction field are flags. In the formats used with the remainder unit 10, the five flags include the flags that are defined by IEEE Std. 754, including an invalid operation flag "n," an overflow flag "o," an underflow flag "u," a division-by-zero flag "z," and an inexact flag "x." For example, a value in the NaN format 76 in which both the overflow flag "o" and the division-by-zero flag "z" are set indicates that the value represents a result of a computation that involved an overflow (this from the overflow flag "o"), as well as an attempt to divide by zero (this from the division-by-zero flag "z"). It should be noted that the flags provide the same status information as provided by, for example, information stored in a floating point status register in a prior art floating point unit. Because the information is provided as part of the result, multiple instructions can be contemporaneously executed. In this manner, the floating point status information that may be generated during execution of one instruction, when stored, will not over-write previously-stored floating point status information generated during execution of another instruction.

In addition to including status information in the five low-order bits $f_{lsb+4} \ldots f_{lsb}$ of the fraction field for values in the NaN format 76, other information can also be encoded in the next five low-order bits $f_{lsb+9} \ldots f_{lsb+5}$. If the value in the NaN format 76 is the result of an operation, the other information indicates the operation and types of operands that gave rise to the result. In one embodiment, the other information is associated with binary encoded values (BEV) of those bits $f_{lsb+9} \ldots f_{lsb+5}$ as follows:

| Bit Pattern Of Result | BEV of $f_{lsb+9} \ldots f_{lsb+5}$ | Meaning |
|---|---|---|
|  | 0 or 1 | no specific meaning |
| s 11111111 1000000000000010nouzx | 2 | infinity minus infinity |
| s 11111111 1000000000000011nouzx | 3 | OV minus OV |
| s 11111111 1000000000000100nouzx | 4 | zero times infinity |
| s 11111111 1000000000000101nouzx | 5 | UN times OV |
|  | 6 or 7 | no specific meaning |
| s 11111111 1000000000001000nouzx | 8 | zero divided by zero |
| s 11111111 1000000000001001nouzx | 9 | infinity divided by infinity |
| s 11111111 1000000000001010nouzx | 10 | UN divided by UN |
| s 11111111 1000000000001011nouzx | 11 | OV divided by OV |
| s 11111111 1000000000001100nouzx | 12 | square root of less than zero |
|  | 13-16 | no specific meaning |
| s 11111111 1000000000010001nouzx | 17 | remainder by zero |
| s 11111111 1000000000010010nouzx | 18 | remainder by UN |
| s 11111111 1000000000010011nouzx | 19 | remainder by OV |
| s 11111111 1000000000010100nouzx | 20 | remainder of infinity |
| s 11111111 1000000000010101nouzx | 21 | remainder of infinity by zero |
| s 11111111 1000000000010110nouzx | 22 | remainder of infinity by UN |
| s 11111111 1000000000010111nouzx | 23 | remainder of infinity by OV |
| s 11111111 1000000000011000nouzx | 24 | remainder of OV |
| s 11111111 1000000000011001nouzx | 25 | remainder of OV by zero |
| s 11111111 1000000000011010nouzx | 26 | remainder of OV by UN |
| s 11111111 1000000000011011nouzx | 27 | remainder of OV by OV |
|  | 28-31 | no specific meaning |

In the following, it will be assumed that the formats represent thirty-two bit values; extension to, for example, sixty-four bit values or values represented in other numbers of bits will be readily apparent to those skilled in the art. Additionally, "OV" refers to an operand in the overflow format 74, "UN" refers to an operand in the underflow format 71, and "infinity" refers to an operand in the infinity format 75.

With this background, the structure and operation of the exemplary remainder unit 10 will be described in connection with FIG. 1 and consistent with an embodiment of the invention. With reference to FIG. 1, the exemplary remainder unit 10 includes two operand buffers 11A and 11B, respective operand analysis circuits 12A and 12B, a remainder core 13, a result assembler 14, and a remainder decision table logic circuit 15. The operand buffers 11A and 11B receive and store respective operands from, for example, a set of registers (not shown) in a conventional manner. The remainder core 13 receives the operands from the operand buffers 11A and 11B, and generates a result in accordance with IEEE Std. 754. Remainder core 13 is conventional and will not be described in detail herein.

Each operand analysis circuit 12A, 12B analyzes the operand in the respective buffers 11A, 11B and generates signals providing information relating thereto, which signals are provided to the remainder decision table logic circuit 15. The result assembler 14 receives information from a number of sources, including the operand buffers 11A and 11B, remainder core 13 and several predetermined value stores as described below. Under control of control signals from the remainder decision table logic circuit 15, the results assembler 14 assembles the result, which is provided on a result bus 17. The result bus 17, in turn, may deliver the result to any convenient destination, such as a register in a register set (not shown), for storage or other use.

The system for providing a floating point remainder may comprise an analyzer circuit configured to determine a first status of a first floating point operand and a second status of a second floating point operand based upon data within the first floating point operand and the second floating point operand, respectively. In one embodiment, the analyzer circuit includes buffers 11A, 11B and analysis circuits 12A, 12B. In addition, the system for providing a floating point remainder includes a results circuit coupled to the analyzer circuit. The results circuit is configured to assert a resulting floating point operand containing the remainder of the first floating point operand and the second floating point operand and a resulting status embedded within the resulting floating point operand. The results circuit may be implemented with a remainder circuit (comprising the remainder core 13), the remainder decision table logic circuit 15, and result assembler 14.

Those skilled in the art will appreciate that the invention may be practiced in an electrical circuit comprising discrete electronic elements, packaged or integrated electronic chips containing logic gates, a circuit utilizing a microprocessor, or on a single chip containing electronic elements or microprocessors. It may also be provided using other technologies capable of performing logical operations such as, for example, AND, OR, and NOT, including but not limited to mechanical, optical, fluidic, and quantum technologies. In addition, the invention may be practiced within a general purpose computer or in any other circuits or systems as are known by those skilled in the art.

As noted above, each operand analysis circuit 12A, 12B analyzes the operand in the respective buffers 11A, 11B and generates signals providing information relating thereto. These signals are provided to the remainder decision table logic circuit 15. In the illustrated embodiment, each exemplary operand analysis circuit 12A, 12B is implemented with a number of comparators, including (i) a comparator 20A, 20B that generates an asserted signal if the bits $e_{msb} \ldots e_{lsb}$ of the exponent field of the operand in respective buffers 11A, 11B are all binary ones, which will be the case if the operand is in the infinity format 75 or the NaN format 76;

(ii) a comparator 21A, 21B that generates an asserted signal if the bits $e_{msb}, \ldots e_{lsb+1}$ of the exponent field of the operand in the respective buffers 11A, 11B are all binary ones and the bit $e_{lsb}$ is a binary zero, which will be the case if the operand is in the overflow format 74;

(iii) a comparator 22A, 22B that generates an asserted signal if the bit $e_{msb} \ldots e_{lsb}$ of the exponent field of the operand in respective buffers 11A, 11B are all binary zeros, which will be the case if the operand is in the zero format 70, underflow format 71, or denormalized format 72;

(iv) a comparator 30A, 30B that generates an asserted signal if the bits $f_{msb} \ldots f_{lsb+5}$ of the fraction field of the operand in the respective buffers 11A, 11B are all binary ones, which may be the case if the operand is in the denormalized format 72, normalized non-zero format 73, overflow format 74, or NaN format 76;

(v) a comparator 31A, 31B that generates an asserted signal if the bits $f_{msb} \ldots f_{lsb+5}$ of the fraction field of the operand in the respective buffers 11A, 11B are all binary zeros, which may be the case if the operand is in the zero format 70, underflow format 72, denormalized format 72, normalized non-zero format 73, or infinity format 75;

(vi) a comparator 32A, 32B that generates an asserted signal if the bits $f_{lsb+4} \ldots f_{lsb}$ of the fraction field of the operand in the respective buffers 11A, 11B are all binary ones, which may be the case if the operand is in the denormalized format 72 or normalized non-zero format 73, and which will be the case if the operand is in the overflow format 74, or if all of the flags "n,", "o" "u," "z," and "x" are set in the infinity format 75 or NaN format 76;

(vii) a comparator 33A, 33B that generates an asserted signal if the bits $f_{lsb+4} \ldots f_{lsb+1}$ of the fraction field of the operand in the respective buffers 11A, 11B are all binary zeros, and if the bit $f_{lsb}$ of the fraction field is either a binary "zero" or "one," which will be the case if the operand is in the zero format 70 or the underflow format 71, and which may be the case if the operand is in the denormalized format 72 or normalized non-zero format 73, overflow format 74, or if the flags "n," "o," "u," and "z" are clear and the flag "x" is either set or clear in the infinity format 75 or NaN format 76;

(viii) a comparator 34A, 34B that generates an asserted signal if the bits $f_{lsb+4} \ldots f_{lsb+1}$ of the fraction field of the operand in the respective buffers 11A, 11B are binary zeros and if the bit $f_{lsb}$ of the fraction field is a binary "one," which will be the case if the operand is in the underflow format 71, and which may be the case if the operand is in the denormalized format 72 or normalized non-zero format 73, or if the flags "n," "o," "u," and "z" are clear and the flag "x" is set in the infinity format 75 or NaN format 76; and (ix) a comparator 35A, 35B that generates an asserted signal if all of the bits $f_{lsb+4} \ldots f_{lsb}$ of the fraction field of the operand in the respective buffers 11A, 11B are binary zeros, which will be the case if the operand is in the zero format 70, and which may be the case if the operand is in the denormalized format 72 or normalized non-zero format 73, or if the flags "n," "o," "u," "z" and "x" are clear in the infinity format 75 or NaN format 76.

In the illustrated embodiment, operand analysis circuit 12A, 12B also includes combinatorial logic elements that receive selected ones of the signals from the comparators and generates asserted signals to provide indications as to certain characteristics of the respective operand, including:

(x) an AND gate 50A, 50B, which will generate an asserted signal if comparators 31A, 31B, and 35A, 35B, are both generating asserted signals, which will be the case if the bits $f_{msb} \ldots f_{lsb}$ of the fraction field of the operand in the respective operand buffers 11A, 11B have the bit pattern 00000000000000000000000;

(xi) an AND gate 51A, 51B, which will generate an asserted signal if comparators 31A, 31B, and 34A, 34B, are both generating asserted signals, which will be the case if the bits $f_{msb} \ldots f_{lsb}$ of the fraction field of the operand in the respective operand buffers 11A, 11B have the bit pattern 00000000000000000000001;

(xii) an AND gate 52A, 52B, which will generate an asserted signal if comparators 30A, 30B, and 32A, 32B, are both generating asserted signals, which will be the case if the bits $f_{msb} \ldots f_{lsb}$ of the fraction field of the operand in the respective operand buffers 11A, 11B have the bit pattern 11111111111111111111111;

(xiii) an AND gate 40A, 40B that generates an asserted signal if the signals generated by both comparator 31A, 31B and comparator 33A, 33B are asserted, which will be the case if the respective operand is in the zero format 70 or underflow format 71, and which may be the case if the operand is in the normalized non-zero format 73, or if the flags "n," "o," "u," and "z" are clear and the flag "x" is either set or clear in the infinity format 75; otherwise stated, AND gate 40A, 40B will generate an asserted signal if the bits $f_{msb} \ldots f_{lsb}$ of the fraction field of the operand in the respective operand buffers 11A, 11B has the bit pattern 00000000000000000000001 or 00000000000000000000000;

(xiv) a NAND gate 45A, 45B that generates an asserted signal if the signal generated by comparator 22A, 22B is asserted and the signal generated by AND gate 40A and 40B is negated, which will be the case if the respective operand is in the denormalized format 72; more specifically, NAND gate 45A, 45B will generate an asserted signal if the bits $e_{msb} \ldots e_{lsb}$ of the exponent field of the operand in the respective operand buffers 11A, 11B have the pattern 00000000 and a bit of the fraction field, other than the low order bit $f_{lsb}$, is a "one;"

(xv) a NAND gate 46A, 46B, which will generate an asserted signal if all of comparator 20A, 20B, comparator 21A, 21B, and comparator 22A, 22B are generating negated signals, which will be the case if the bits $e_{msb} \ldots e_{lsb}$ of the exponent field are not all "ones" or "zeros," and at least one bit, in addition to or other than the least significant bit $e_{lsb}$ is also a "zero;"

(xvi) a NAND gate 47A, 47B, which will generate an asserted signal if comparator 21A, 21B is generating an asserted signal and AND gate 52A, 52B is generating a negated signal, which will be the case if the bits $e_{msb} \ldots e_{lsb}$ of the exponent field of the operand in the respective operand buffers 11A, 11B have the bit pattern 11111110 and not all bits $f_{msb} \ldots f_{lsb}$ of the fraction field of the operand in the respective operand buffers 11A, 11B are "one," so that the NAND gate 47A, 47B will generate an asserted signal if which will be the case if the bits $e_{msb} \ldots e_{lsb}$ of the exponent field of the operand in the respective operand buffers 11A, 11B have the bit pattern 111111110 and at least one of the bits $f_{msb} \ldots f_{lsb}$ of the fraction field of the operand in the respective operand buffers 11A, 11B is "zero;" and (xvii) an OR gate 48A, 48B which will generate an asserted signal if any of NAND gate 45A, 45B, NAND gate 46A, 46B or NAND gate 47A, 47B is asserted, which will be the case if the operand in the respective operand buffer 11A, 11B is in the denormalized format 72 or the normalized non-zero format 73.

In addition, the exemplary combinatorial logic in the illustrated embodiment includes a comparator 53 that generates an asserted signal if the bits $f_{msb} \ldots f_{lsb+5}$ of the fraction field of the operand in operand buffer 11A represent a binary-encoded value that is larger than the binary-encoded value represented by bits $f_{msb} \ldots f_{lsb+5}$ of the fraction field of the operand in operand buffer 11B.

Each exemplary operand analysis circuit 12A, 12B provides signals to the remainder decision table logic 15 as shown in the following table:

| | |
|---|---|
| (a) | the signal generated by the comparator 22A, 22B; |
| (b) | the signal generated by the comparator 21A, 21B; |
| (c) | the signal generated by the comparator 20A, 20B; |
| (d) | the signal generated by the comparator 31A, 31B; |
| (e) | the signal generated by AND gate 50A; 50B; |
| (f) | the signal generated by AND gate 51A, 51B; |
| (g) | the signal generated by AND gate 52A, 52B; and |
| (h) | the signal generated by the OR gate 48A, 48B. |

In addition, the signal generated by comparator 53 is also provided to the remainder decision table logic 15.

The exemplary remainder decision table logic 15 essentially generates control signals for controlling the result assembler. As noted above, the result assembler 14 receives information from a number of sources, including the operand buffers 11A and 11B, remainder core 13 and several predetermined value stores as described below. Under control of control signals from the remainder decision table logic circuit 15, the result assembler 14 assembles the appropriate result representing a remainder of the two operands, onto a result bus 17. In general, the result assembler 14 essentially assembles the result in four segments, including a sign segment that represents the sign bit of the result, an exponent segment that represents the exponent field of the result, a high-order fraction segment that represents the bits $f_{msb} \ldots f_{lsb+5}$ of the fraction field of the result, and a low-order fraction segment that represents the five least significant bits $f_{lsb+4} \ldots f_{lsb}$ of the result. It will be appreciated that the low-order fraction segment for results in the infinity format 75 and NaN format 76 corresponds to the flags "n," "o," "u," "z," and "x." One or more of these segments will represent an embedded resulting status of the resulting floating point operand.

In the illustrated embodiment, the result assembler includes four elements, including a multiplexer 60, an exponent field selector 61, a high-order fraction field selector 62 and low-order fraction field combiner 63. The multiplexer 60 selectively couples one of a signal representative of the sign bit of the value generated by the remainder core 13 and the sign bit from the first operand 11A under control of a control signal from the remainder decision table logic 15. If the control signal is asserted, the multiplexer couples the signal representative of the sign bit of the value generated by the remainder core 13 to the result bus 17 as the sign of the result. As will be described below, if this control signal is asserted, the selectors 61, 62 and 63 will also couple respective signals provided thereto by the remainder core 13 to the result bus as respective segments of the results. Accordingly, if this control signal is asserted, the selector 61 will couple the signals representative of the exponent field of the value generated by the remainder core 13 to the result bus 17 as the exponent field of the result, the selector 62 will couple the signals representative of the bits $f_{msb} \ldots f_{lsb+5}$ of the fraction field of the value generated by the remainder core 13 to the result bus 17 as the corresponding bits $f_{msb} \ldots f_{lsb+5}$ of the fraction field of the result, and combiner 63 will couple the signals representative of the bits $f_{lsb+4} \ldots f_{lsb}$ of the fraction field of the value generated by the remainder core 13 to the result bus 17 as the corresponding bits $f_{lsb+4} \ldots f_{lsb}$ of the fraction field of the result. Accordingly, if the remainder decision table logic 15 generates this control signal, the result will correspond to the value generated by the remainder core, except that one or more of the low-order bits $f_{lsb+4} \ldots f_{lsb}$ may be forced to be "one," or set, by the combiner 63 as will be described below.

In the illustrated embodiment noted above, the selector 61 couples exponent value signals representative of the exponent field of the result to the result bus 17. The exemplary selector 61 receives four sets of exponent field value signals, namely, the signals from the remainder core 13 associated with the exponent field, the exponent signals representative of the exponent bits $e_{msb} \ldots e_{lsb}$ of the exponent field of the operand in operand buffer 11A, as well as two sets of signals representative of two predetermined exponent field bit patterns such as the patterns depicted in FIG. 1. It will be appreciated that these predetermined exponent field bit patterns correspond to the exponent fields associated with the zero format 70, underflow format 71, infinity format 75 and NaN format 76. In addition, the selector 61 receives four exponent field control signals from the remainder decision table logic 15. Each of the control signals is associated with different ones of the signals from the remainder core 13 that are associated with the exponent field. One signal is associated with the signals from the operand buffer 11A. The rest of these control signals are associated with each of the sets of exponent field value signals, respectively. In enabling the result assembler 14 to assemble the result, the remainder decision table logic will assert one of the four exponent field control signals, and the selector 61 will couple the set of exponent field value signals associated with the asserted exponent field control signal to the result bus 17 to provide the exponent field of the result.

In the illustrated embodiment, the exemplary selector 62 couples high-order fraction field signals representative of the high-order fraction field bits $f_{lsb} \ldots f_{lsb+5}$ of the fraction field of the result to the result bus 17. The selector 62 receives six sets of high-order fraction field value signals, namely, the signals from the remainder core 13 associated with the high-order fraction field, signals representative of bits $f_{msb} \ldots f_{lsb+5}$ of the fraction field of the operand in buffer 11A, signals representative of bits $f_{lsb} \ldots f_{lsb+5}$ of the fraction field of the operand in buffer 11B, as well as three sets of signals representative of three predetermined high-order fraction field bit patterns as depicted in FIG. 1, including (a) 000000000000000000, which corresponds to the high-order fraction field bit pattern that is associated with the zero format 70, underflow format 71, and denormalized format 72, and infinity format 75, (b) 111111111111111111, which corresponds to the high-order fraction field bit pattern that is associated with the overflow format 74, and which also corresponds to a high-order fraction field bit pattern that may also be associated with the NaN format 76, and (c) 10000000000001, which corresponds to bits $f_{msb} \ldots f_{lsb+9}$ of the high-order fraction field associated with the NaN format 76, in which, as described above, information is be encoded in the five low-order bits $f_{lsb+9} \ldots f_{lsb+5}$ of the high-order fraction field; in particular, information indicating remainder by zero, remainder by UN, remainder by OV, remainder of infinity, remainder of infinity by zero, remainder of infinity by UN, remainder of infinity by OV, remainder of OV, remainder of OV by zero, remainder of OV by UN and remainder of OV by OV; it will be appreciated that the bit $f_{lsb+9}$ is included in the bit pattern indicated above, and the four bits $f_{lsb+8} \ldots f_{lsb+5}$ are provided as control signals by the remainder decision table logic 15.

In addition, the selector 62 receives six high-order fraction field control signals from the remainder decision table logic 15. One control signal is associated with the remainder core 13. Two more control signals are associated with the signals from the operand buffers 11A and 11B, respectively. The rest of the control signals are associated with each of the sets of high-order fraction field value signals, respectively. It will be appreciated that the control signal associated with the remainder core 13 is the same control signal that controls the multiplexer 60 and selector 61.

In enabling the result assembler 14 to assemble the result, the remainder decision table logic will assert one of the six high-order fraction field control signals, and the selector 62 will couple the set of high-order fraction field value signals associated with the asserted high-order fraction field control signal to the result bus 17 to provide bits $f_{msb} \ldots f_{lsb+5}$ of the fraction field of the result.

Similarly, the combiner 63 in the illustrated embodiment couples low-order fraction field value signals representative of the low-order fraction field bits $f_{lsb+4} \ldots f_{lsb}$ of the fraction field of the result to the result bus 17. The combiner 63 receives four sets of low-order fraction field signals, namely, the signals from the remainder core 13 associated with the low-order fraction field, signals representative of bits $f_{lsb+4} \ldots f_{lsb}$ of the fraction field of the operand in buffer 11A, signals representative of bits $f_{lsb+4} \ldots f_{lsb}$ of the fraction field of the operand in buffer 11B, and one set of signals from the remainder decision table logic 15. It will be appreciated that in the illustrated embodiment, the set of signals provided by the remainder decision table logic 15 are used in controlling the condition of flags "n," "o," "u," "z," and "x" for those formats in which the low order bits $f_{lsb+4} \ldots f_{lsb}$ represent flags. In addition, the sets of signals provided by the operands in buffers 11A and 11B may also represent the flags "n," "o," "u," "z," and "x." In addition, the combiner 63 receives three low-order fraction field control signals from the remainder decision table logic 15. One control signal is associated with the set of low-order fraction field value signals provided by the remainder core 13 and the two others are associated with the sets of signals provided by the buffers 11A and 11B, respectively.

In enabling the result assembler 14 to assemble the result, the remainder decision table logic 15 may provide signals representative of the low-order fraction field and negate all of the low-order fraction field control signals. When this occurs, the signals representative of the low-order fraction field provided by the remainder decision table logic 15 will be coupled to the result bus 13 to provide bits $f_{lsb+4} \ldots f_{lsb}$ of the fraction field of the result.

Alternatively, the remainder decision table logic 15 may negate all of the low-order fraction field value signals provided thereby and assert one of the three low-order fraction field control signals. When this occurs, the combiner 63 will couple the set of low-order fraction field value signals associated with the asserted low-order fraction field control signal to the result bus 17 to provide bits $f_{lsb+4} \ldots f_{lsb}$ of the fraction field of the result. As a further alternative, the remainder decision table logic 15 may negate all of the low-order fraction field value signals provided thereby and assert more than one of the three low-order fraction field control signals. As a result, the combiner 63 will couple the bitwise OR of the sets of low-order fraction field value signals associated with the asserted low-order fraction field control signals to the result bus 17 to provide bits $f_{lsb+4} \ldots f_{lsb}$ of the fraction field of the result. As yet another alternative, the remainder decision table logic 15 may assert one or more of the low-order fraction field value signals provided thereby and assert one or more of the three low-order fraction field control signals. As a result, the combiner 63 will couple the bitwise OR of the sets of low-order fraction field value signals associated with the asserted low-order fraction field field control signals and the low-order fraction field value signals provided by the remainder decision table logic 15 to the result bus 17 to provide bits $f_{lsb+4} \ldots f_{lsb}$ of the fraction field of the result.

In more detail, the exemplary combiner 63 in the illustrated embodiment comprises an OR circuit 67 and three AND circuits 64 through 66. Each gate depicted may represent five gates. The AND circuits 64-66 receive the low-order fraction field value signals from the remainder core 13 and operand buffers 11A and 11B respectively, as well as the respective low-order fraction field control signal. These AND circuits 64-66 perform a bitwise AND operation to, if the respective low-order fraction field control signal is asserted, couple the low-order fraction field value signals to a respective input of OR circuit 67. The OR circuit 67, whose output is connected to the result bus 17, performs a bitwise OR operation in connection with the signals that it receives from the AND circuits 64-66 and the low-order fraction field value signals provided by the remainder decision table logic 15. If the remainder decision table logic 15 negates all of the low-order fraction field control signals, the AND circuits 64-66 will block the low-order fraction field value signals that they receive and the signals provided by the OR circuit 67 will conform to the low-order fraction field value signals provided by the remainder decision table logic 15.

On the other hand, if the remainder decision table logic 15 asserts one or more of the low-order fraction field control signals, the AND circuits 64-66 that receive the asserted low-order fraction field control signal will couple the low-order fraction field value signals that they receive to the OR circuit 67 and the other AND gates will block the low-order fraction field signal that they receive. As will be described below, under some circumstances, the remainder decision table logic 15 will assert two low-order fraction field control signals to enable two sets of low-order fraction field value signals to be coupled to the OR circuit 67. In that case, the OR gate 67 will perform a bitwise OR operation in connection with signals representing respective bits of the low-order fraction field.

Thus, remainder decision table logic 15 will assert two low-order fraction signals if, for example, both operands in operand buffers 11A and 11B are in NaN format to enable the respective flags "n," "o," "u," "z" and "x" to be ORed together. However, if the low-order fraction field value signals provided by the remainder decision table logic 15 are negated, the low-order fraction field value signals provided by the OR circuit 67 will conform to the low-order fraction field signals provided by the AND circuit or circuits that receive the asserted low-order fraction field control signal.

As noted above, the exemplary remainder decision table logic 15 generates control signals for controlling the selectors 61 and 62 and combiner 63 that make up the result assembler 14. The control signals generated by the remainder decision table logic 15 are such as to enable the result to be assembled in the desired format 70-76 having status information embedded within the result itself. Before proceeding further, it would be helpful to describe the results that are to be generated by the remainder unit 10.

Generally, exemplary results generated by the remainder unit 10 are described in the table depicted in FIG. 3 and are consistent with an embodiment of the present invention. In that table, one skilled in the art will appreciate that "+P" or "+Q" means any finite positive representable value other than +OV (that is, a value in the overflow format 74 with the sign bit "s" being "zero") or +UN (that is, a value in the underflow format 71 with the sign bit "s" being "zero"). "−P" or "−Q" means any finite negative representable value other than −OV (that is, a value in the overflow format 74, with the sign bit "s" being "one") or −UN (that is, a value in the underflow format 71 with the sign bit "s" being "one"). Finally, those skilled in the art will appreciate that "NaN" means any value whose exponent field is 11111111, other than one of the values represented by −∞ (that is, a value in the infinity format 75, with the sign bit "s" being "zero") and −∞ (that is, a value in the infinity format 75, with the sign bit "s" being "one").

Key to symbols in the table with exemplary results depicted in FIG. 3 are as follows:

(a) The result is a NaN value s 11111111 10000000000101001ouzx (to indicate "remainder of infinity" with the invalid operation flag set), where ouzx is the bitwise OR of the four least significant bits $f_{lsb+3} \ldots f_{lsb}$ of the fraction fields of the operands. The sign of the result is the same as the sign of the first operand.

(b) The result is a NaN value s 11111111 10000000000010111nouzx (to indicate "remainder of infinity by OV"), where nouzx is the bitwise OR of the five least significant bits $f_{lsb+4} \ldots f_{lsb}$ the fraction field of the infinite operand with 11001 (to indicate invalid operation, overflow, and inexact). The sign of the result is the same as the sign of the first operand.

(c) The result is a NaN value s 1111111 10000000000101001ouzx (to indicate "remainder of infinity" with the invalid operation flag set), where ouzx is the low four bits of the infinite operand. The sign of the result is the same as the sign of the first operand.

(d) The result is a NaN value s 11111111 10000000000010110nouzx (to indicate "remainder of infinity by UN"), where nouzx is the bitwise OR of the five least significant bits $f_{lsb+4} \ldots f_{lsb}$ of the fraction field of the infinite operand with 10101 (to indicate invalid operation, underflow, and inexact). The sign of the result is the same as the sign of the first operand.

(e) The result is a NaN value s 11111111 10000000000101011ouzx (to indicate "remainder of infinity by zero" with the invalid operation flag set), where ouzx is the four least significant bits $f_{lsb+3} \ldots f_{lsb}$ of the fraction field of the infinite operand. The sign of the result is the same as the sign of the first operand.

The result is a copy of the NaN operand, except that the sign of the result is the same as the sign of the first operand, and the five least significant bits $f_{lsb+4} \ldots f_{lsb}$ of the fraction field of the result are the bitwise OR of the five least significant bits $f_{lsb+4} \ldots f_{lsb}$ of the fraction fields of the two operands.

(g) The result is a copy of the first operand (either −OV or +OV). (Note: one skilled in the art might expect the result to be a NaN value s 11111111 10000000000011000nouzx (to indicate "remainder of OV"), where nouzx is the bitwise OR of the five least significant bits $f_{lsb+4} \ldots f_{lsb}$ of the fraction field of the infinite operand with 11001 (to indicate invalid operation, overflow, and inexact), and where the sign of the result is the same as the sign of the first operand. However, in this exemplary embodiment, the actual result is a copy of the first operand, in order to preserve an important numerical identity, which is that REM(x, +Inf)=REM(x, −Inf)=x.)

(h) The result is a NaN value s 11111111 10000000000001101111001 (to indicate "remainder of OV by OV" with the invalid operation, overflow, and inexact flags set). The sign of the result is the same as the sign of the first operand.

(i) The result is a NaN value s 11111111 10000000000001100011001 (to indicate "remainder of OV"

with the invalid operation, overflow, and inexact flags set). The sign of the result is the same as the sign of the first operand.

(j) The result is a NaN values 11111111 10000000000001101011101 (to indicate "remainder of OV by UN" with the invalid operation, overflow, underflow, and inexact flags set). The sign of the result is the same as the sign of the first operand.

(k) The result is a NaN value s 11111111 10000000000001100111001 (to indicate "remainder of OV by zero" with the invalid operation, overflow, and inexact flags set). The sign of the result is the same as the sign of the first operand.

(l) The result is a copy of the NaN operand, except that the sign of the result is the same as the sign of the first operand, and the five least significant bits $f_{lsb+4} \ldots f_{lsb}$ of the fraction field of the result are ORed with 01001 (to indicate overflow and inexact).

(m) The result is a NaN value s 11111111 10000000000001001111001 (to indicate "remainder by OV" with the invalid operation, overflow, and inexact flags set). The sign of the result is the same as the sign of the first operand.

(n) The result is calculated in accordance with IEEE Std. 754. (Note that in this case the sign of the result is not necessarily the same as the sign of the first operand.)

(o) The result is a NaN value s 11111111 10000000000001001010101 (to indicate "remainder by UN" with the invalid operation, underflow, and inexact flags set). The sign of the result is the same as the sign of the first operand.

(p) The result is a NaN value s 11111111 10000000000001000110000 (to indicate "remainder by zero" with the invalid operation flag set). The sign of the result is the same as the sign of the first operand.

(q) The result is a copy of the NaN operand, except that the sign of the result is the same as the sign of the first operand.

(r) The result is a NaN value s 11111111 10000000000001001111101 (to indicate "remainder by OV" with the invalid operation, overflow, underflow, and inexact flags set). The sign of the result is the same as the sign of the first operand.

(s) The result is a NaN value s 11111111 10000000000001000110101 (to indicate "remainder by zero" with the invalid operation, underflow, and inexact flags set). The sign of the result is the same as the sign of the first operand.

(t) The result is a copy of the NaN operand, except that the sign of the result is the same as the sign of the first operand, and the low five bits of the result are ORed with 00101 (to indicate underflow and inexact).

(u) The result is a copy of the NaN operand, except that the five least significant bits $f_{lsb+4} \ldots f_{lsb}$ of the fraction field of the result are the bitwise OR of the five least significant bits $f_{lsb+4} \ldots f_{lsb}$ of the fraction fields of the operands.

(v) The result is a copy of the NaN operand, except that the five least significant bits $f_{lsb+4} \ldots f_{lsb}$ of the fraction field of the result are ORed with 01001 (to indicate overflow and inexact).

(w) The result is a copy of the NaN operand.

(x) The result is a copy of the NaN operand, except that the five least significant bits $f_{lsb+4} \ldots f_{lsb}$ of the fraction field of the result are ORed with 00101 (to indicate underflow and inexact).

(y) The result is a copy of the NaN operand whose fraction field represents the larger value, except that the five least significant bits $f_{lsb+4} \ldots f_{lsb}$ of the fraction field of the result are the bitwise OR of the low five bits of each operand and the sign of the result is the same as the sign of the first operand.

Remainder operations are not affected by the rounding mode.

As noted above, remainder decision table logic 15 generates control signals for controlling the multiplexer 60, selectors 61, 62 and combiner 63 making up the exemplary result assembler 14 the particular signals that the remainder decision table logic 15 will generate depends on the signals provided thereto by the operand buffers 11A and 11B representing the states of the respective sign bits, the operand analysis circuits 12A and 12B, and comparator 53. In this illustrated embodiment, the series of input signals received by the remainder decision table logic 15 are as follows:

(a) a signal from comparator 22A that is asserted if the exponent field of the operand in operand buffer 11A has the bit pattern 00000000;

(b) a signal from comparator 21A that is asserted if the exponent field of the operand in operand buffer 11A has the bit pattern 11111110;

(c) a signal from comparator 20A that is asserted if the exponent field of the operand in operand buffer 11A has the bit pattern 11111111;

(d) a signal from the comparator 31A that is asserted if the operand in operand buffer 11A has a high-order fraction field with all 0-bits;

(e) a signal from AND gate 50A that is asserted if the operand in operand buffer 11A has high- and low-order fraction fields with the collective bit pattern 00000000000000000000000;

(f) a signal from AND gate 51A that is asserted if the operand in operand buffer 11A has high- and low-order fraction fields with the collective bit pattern 00000000000000000000001;

(g) a signal from AND gate 52A that is asserted if the operand in operand buffer 11A has high- and low-order fraction fields with the collective bit pattern (h) a signal from OR gate 48A that is asserted if any of the following signals are asserted:

(1) a signal from NAND gate 45A that is asserted if the exponent field of the operand in operand buffer 11A has a bit pattern 00000000 (which will be the case if the signal from comparator 22A is asserted) and the high- and low-order fraction field of the operand in operand buffer 11A has a bit pattern in which at least one bit, other than the least significant bit, is "1" (which will be the case if the signal from AND gate 40A is negated);

(2) a signal from NAND gate 46A that is asserted if the exponent field of the operand in operand buffer 11A has a bit pattern in which the bits $e_{msb} \ldots e_{lsb}$ of the exponent field are not all "ones" or "zeros," and at least one bit, in addition to or other than the least significant bit $e_{lsb}$ is also a "zero"; and (3) a signal from NAND gate 47A that is asserted if the exponent field of the operand in operand buffer 11A has the bit pattern 11111110 (which will be the case if the signal from comparator 21A is asserted) and at least one bit of the fraction in the fraction field of the operand in operand buffer 11A is "0" (which will be the case if the signal from AND gate 52A is negated);

(i) a signal from comparator 22B that is asserted if the exponent field of the operand in operand buffer 11B has the bit pattern 00000000;

(j) a signal from comparator 21B that is asserted if the exponent field of the operand in operand buffer 11B has the bit pattern 11111110;

(k) a signal from comparator 20B that is asserted if the exponent field of the operand in operand buffer 11B has the bit pattern 11111111;

(l) a signal from the comparator 31B that is asserted if the operand in operand buffer 11B has a high-order fraction field with all 0-bits;

(m) a signal from AND gate 50B that is asserted if the operand in operand buffer 11B has high- and low-order fraction fields with the collective bit pattern 00000000000000000000000;

(n) a signal from AND gate 51B that is asserted if the operand in operand buffer 11B has high- and low-order fraction fields with the collective bit pattern 00000000000000000000001;

(o) a signal from AND gate 52B that is asserted if the operand in operand buffer 11B has high- and low-order fraction fields with the collective bit pattern 11111111111111111111111;

(p) a signal from OR gate 48B that is asserted if any of the following signals are asserted:

(1) a signal from NAND gate 45B that is asserted if the exponent field of the operand in operand buffer 11B has a bit pattern, 00000000 (which will be the case if the signal from comparator 22B is asserted) and the high- and low-order fraction field of the operand in operand buffer 11B has a bit pattern in which at least one bit, other than the least significant bit, is "1" (which will be the case if the signal from AND gate 40B is negated);

(2) a signal from NAND gate 46B that is asserted if the exponent field of the operand in operand buffer 11B has a bit pattern in which the $e_{msb} \ldots e_{lsb}$, of the exponent field are not all "ones" or "zeros," and at least one bit, in addition to or other than the least significant bit $e_{lsb}$ is also a "zero;"

(3) a signal from NAND gate 47B that is asserted if the exponent field of the operand in operand buffer 11A has the bit pattern 11111110 (which will be the case if the signal from comparator 21A is asserted) and at least one bit of the fraction in the fraction field of the operand in operand buffer 11B is "0" (which will be the case if the signal from AND gate 52B is negated); and (q) a signal from comparator 53 that is asserted if the bits $f_{msb} \ldots f_{lsb+5}$ of the fraction field of the operand in operand buffer 11A represent a binary-encoded value that is larger than the binary-encoded value represented by bits $f_{msb} \ldots f_{lsb+5}$ of the fraction field of the operand in operand buffer 11B.

In response to these signals, the exemplary remainder decision logic table 15 generates the following:

(1) a control signal that, if asserted, enables the sign bit, the exponent field, and the high part of the fraction of the result to be provided by the remainder core 13, moreover, the five least significant bits $f_{msb+4} \ldots f_{lsb}$ of the fraction field of the output provided by the remainder core 13 will contribute to the five least significant bits $f_{msb+4} \ldots f_{lsb}$ of the result, and, if negated, enables the sign bit to correspond to the sign of the operand in operand buffer 11A;

(2) a control signal that, if asserted, will enable the exponent field of the result to correspond to the exponent field of the operand in operand buffer 11A;

(3) a control signal that, if asserted, will enable the exponent field of the result to have the bit pattern 00000000;

(4) a control signal that, if asserted, will enable the exponent field of the result to have the bit pattern 11111111;

(5) a control signal that, if asserted, will enable the high-order fraction of the result to correspond to the high-order portion of the fraction of the operand in operand buffer 11A;

(6) a control signal that, if asserted, will enable the high-order fraction of the result to correspond to the high-order portion of the fraction of the operand in operand buffer 11B;

(7) a control signal that, if asserted, will enable the high-order fraction of the result to correspond to the bit pattern 00000000000000000;

(8) a control signal that, if asserted, will enable the high-order fraction of the result to correspond to the bit pattern 11111111111111111;

(9) a control signal that, if asserted, will enable the high-order fraction of the result to correspond to the bit pattern 10000000000001 followed by control signals (10)-(13);

(10)-(13) control signals that, when control signal (9) is asserted, provide additional information regarding remainder operations when the result is in the NaN format 76, as described above;

(14) a control signal that, if asserted, will enable the low-order fraction field of the operand in output buffer 11A to contribute to five least significant bits $f_{lsb+4} \ldots f_{lsb}$ of the fraction field of the result;

(15) a control signal that, if asserted, will enable the low-order fraction field of the operand in output buffer 11B to contribute to five least significant bits $f_{lsb+4} \ldots f_{lsb}$ of the fraction field of the result; and (16)-(20) control signals that always contribute to the five least significant bits $f_{lsb+4} \ldots f_{lsb}$ of the fraction field of the result.

Figure 4:
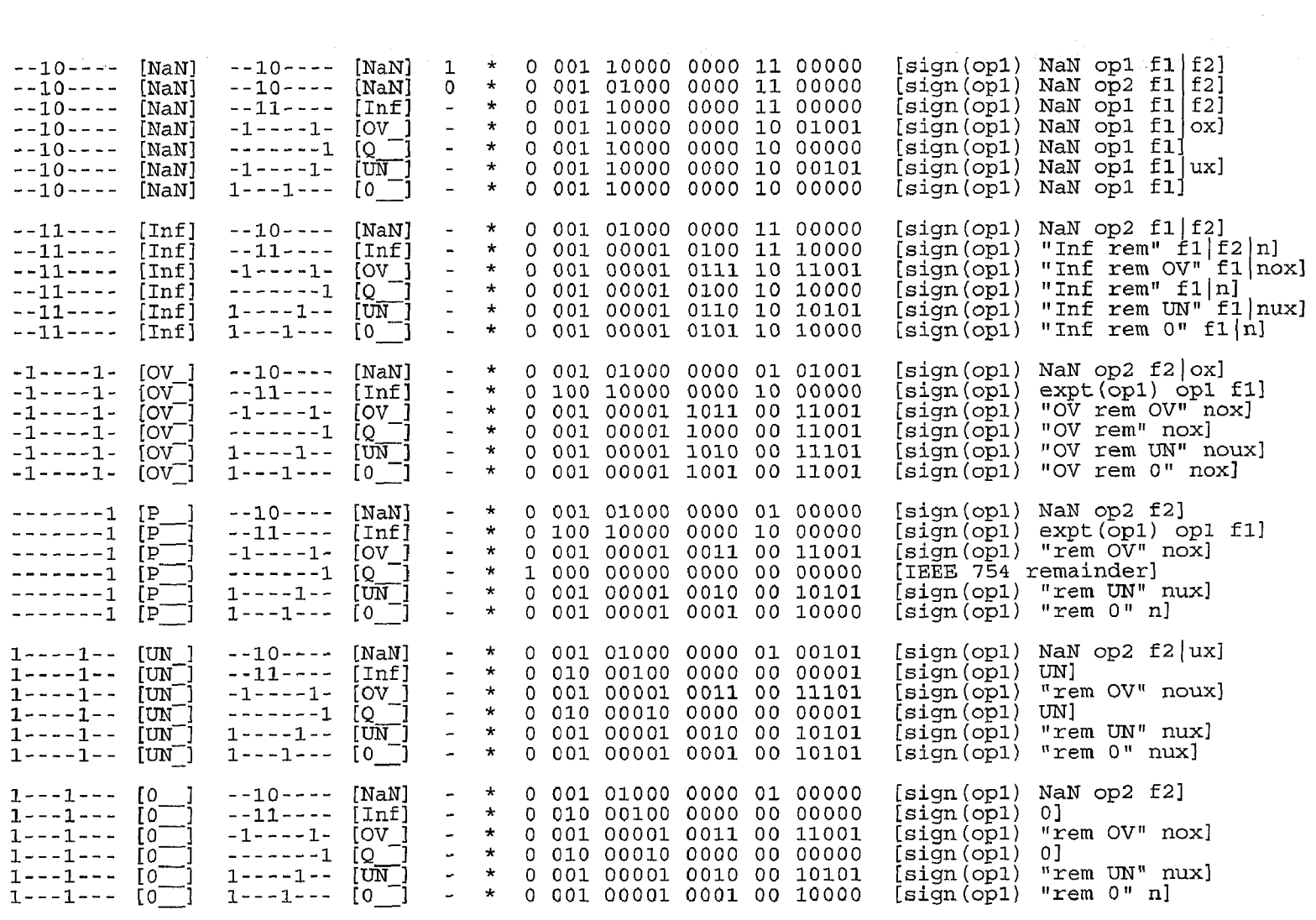

The specific patterns of output signals (1) through (20) generated by the exemplary remainder decision table logic 15 in response to patterns of input signals (a) through (q) are depicted in FIG. 4. Generally, in FIG. 4, each row represents conditions of the output signals (1) through (20) that are generated by the remainder decision table logic 15 in response to one pattern of input signals (a) through (q). In each row, the indicia to the left of the asterisk (*) represent the pattern of input signals (a) through (q) and the indicia to the right of the asterisk represent the pattern of output signals (1) through (20) with a "1" indicating that the respective input or output signal is asserted, a "0" indicating that the respective input or output signal is negated, and a "–" indicating that the respective input signal may be either negated or asserted. Each row is further annotated with an indication as to the respective format 70 through 76 of the operand in the respective operand buffers 11A and 11B and the format of the result.

Referring now to FIG. 4, a discussion of the first row of input signal values and corresponding output signal values follows:

(A) for the three input patterns to the left of the asterisk:
(i) the first pattern "—10—" indicates that signal (c) is asserted, signal (d) is negated, and the other signals (a), (b), and (e) through (h) may be either asserted or negated, with the pattern indicating a value in the NaN format 76 ("[NaN]") of either sign;
(ii) the second pattern "—10—" indicates that signal (k) is asserted, signal (i) is negated, and the other signals (i), (j) and (m) through (p) may be either asserted or negated, with the pattern indicating a value in the NaN format 76 ("[NaN]") of either sign; and
(iii) the third pattern "1" indicates that input signal (q) is asserted indicating that the binary-encoded value of the high-order bits $f_{msb} \ldots f_{lsb+5}$ of the fraction field of the operand in operand buffer 11A is greater than the binary-encoded value of the high-order bits $f_{lsb} \ldots f_{lsb+5}$ of the fraction field of the operand in operand buffer 11B; and (B) for the six output patterns to the right of the asterisk:
(i) the pattern "0" to the immediate right of the asterisk indicates that the control signal provided to multiplexer 60, selectors 61 and 62 and AND circuit 64 is negated, to ensure that the output from remainder core 13 will not contribute the result, and, further, that the sign of the result will correspond to the sign of the operand in operand buffer 11A;

(ii) the second pattern "001" indicates that the control signal will be asserted that will enable selector 61 to couple signals representative of the pattern 11111111 to the result bus 17, and the control signals associated with the signals from the exponent field of the operand in operand buffer 11A and the signals associated with pattern 00000000 will be negated;

(iii) the third pattern "10000" indicates that the control signal will be asserted that will enable selector 62 to couple the signals associated with the bits $f_{msb} \ldots f_{lsb+5}$ comprising the high-order fraction field of the operand in buffer 11A will be coupled to the result bus 17 as the bits $f_{msb} \ldots f_{lsb+5}$ of the fraction field of the result;

(iv) the fourth pattern "0000" indicates that the control signals that provide additional information regarding remainder operations when the result is in the NaN format 76, as described above, will be negated;

(v) the fifth pattern "11" Indicates that the control signals will be asserted that will enable both AND circuits 65 and 66 to couple signals received thereby from both operand buffers 11A and 11B to the OR circuit 63; and (vi) the sixth pattern "00000" indicates that the signals provided by the remainder decision table logic 15 to the OR circuit 63 are all negated; in that case, the OR gate will perform a bitwise OR operation in connection with those signals and the signals provided thereto by AND circuits 65 and 66; the negated signal described in (B)(ii) provides that the signals provided by AND circuit 64 are also negated, in which case the signals coupled by OR circuit 63 to result bus 17 will correspond to the OR of the bits $f_{lsb+4} \ldots f_{lsb}$ the fraction fields of the operands in operand buffers 11A and 11B.

On the right hand side of the first row in FIG. 4, the legend "[sign(op1)NaN op1 f1|f2]" indicates that the result value is in the NaN format 76, whose sign corresponds to the sign of the operand in operand buffer 11A, with the bits $f_{msb} \ldots f_{msb+5}$ of the fraction field of the result corresponding to bits $f_{msb} \ldots f_{lsb+5}$ of the fraction field of the operand in operand buffer 11A (op1) and the bits $f_{lsb+4} \ldots f_{lsb}$ of the result corresponding to the OR of the bits $f_{lsb+4} \ldots f_{lsb}$ of the fraction fields of the operands in both operand buffers 11A and 11B (f1|f2). It should be noted that this corresponds to a result represented by symbol (y) in the table depicted on FIG. 3.

In the context of the above discussion, the other rows of FIG. 4 will be apparent to those skilled in the art.

Remainder decision table logic 15 may be implemented by many different circuit elements that will be apparent to those skilled in the art, including, but not limited to programmable logic arrays, ASIC circuits, general memory registers, other addressable memory storage devices, or a combination thereof.

One of ordinary skill in the art will recognize that other formats and bit patterns could be used to represent the floating point operand formats without departing from the principles of the present invention. One of ordinary skill in the art will also recognize that the floating point status information contained in the operands could easily be represented by other bit combinations (not shown) without departing from the principles of the present invention. For example, more or fewer bits could be used, a subset or superset of the exemplary status bits could be used, or the most significant bits of an operand (or some other subset of bits) could be used to indicate the floating point status information, instead of the least significant bits illustrated.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for providing a floating point remainder, comprising:
an analyzer circuit configured to determine a first status of a first floating point operand and a second status of a second floating point operand based upon data within the first floating point operand and data within the second floating point operand respectively; and
a results circuit coupled to the analyzer circuit and configured to assert a resulting floating point operand containing the remainder of the first floating point operand and the second floating point operand and a resulting status embedded with the resulting floating point operand.

2. The system for providing a floating point remainder of claim 1, wherein the analyzer circuit further comprises:
a first operand buffer configured to store the first floating point operand;
a second operand buffer configured to store the second floating point operand;
a first operand analysis circuit coupled to the first operand buffer, the first operand analysis circuit configured to generate a first characteristic signal having information relating to the first status; and
a second operand analysis circuit coupled to the second operand buffer, the second operand analysis circuit configured to generate a second characteristic signal having information relating to the second status.

3. The system for providing a floating point remainder of claim 2, wherein the first status and the second status are determined without regard to memory storage external to the first operand buffer and the second operand buffer.

4. The system for providing a floating point remainder of claim 3, wherein the memory storage external to the first operand buffer and the second operand buffer is a floating point status register.

5. The system for providing a floating point remainder of claim 1, wherein the results circuit further comprises:
- a remainder circuit coupled to the analyzer circuit, the remainder circuit configured to produce the remainder of the first floating point operand and the second floating point operand;
- a remainder logic circuit coupled to the analyzer circuit and configured to produce the resulting status based upon the first status and the second status; and
- a result assembler coupled to the remainder circuit and the remainder logic circuit, the result assembler configured to assert the resulting floating point operand and embed the resulting status within the resulting floating point operand.

6. The system for providing a floating point remainder of claim 5, wherein remainder logic circuit is organized according to a structure of a decision table.

7. The system for providing a floating point remainder of claim 1, wherein the first status, the second status, and the resulting status are each one of the following: an invalid operation status, an overflow status, an underflow status, a division by zero status, an infinity status, and an inexact status.

8. The system for providing a floating point remainder of claim 7, wherein the overflow status represents one in a group of a plus overflow (+OV) status and a minus overflow (−OV) status.

9. The system for providing a floating point remainder of claim 7, wherein the overflow status is represented as a predetermined non-infinity numerical value.

10. The system for providing a floating point remainder of claim 7, wherein the underflow status represents one in a group of a plus underflow (+UN) status and a minus underflow (−UN) status.

11. The system for providing a floating point remainder of claim 7, wherein the underflow status is represented as a predetermined non-zero numerical value.

12. The system for providing a floating point remainder of claim 7, wherein the invalid status represents a not-a-number (NaN) status due to an invalid operation.

13. The system for providing a floating point remainder of claim 7, wherein the infinity status represents one in a group of a positive infinity status and a negative infinity status.

14. A method for providing a floating point remainder, comprising:
- determining, using an analyzer circuit, a first status of a first floating point operand and a second status of a second floating point operand based upon data within the first floating point operand and data within the second floating point operand respectively; and
- asserting, using a results circuit, a resulting floating point operand containing the remainder of the first floating point operand and the second floating point operand and a resulting status embedded with the resulting floating point operand.

15. The method for providing a floating point remainder of claim 14, wherein the determining stage further comprises:
- storing the first floating point operand in a first operand buffer;
- storing the second floating point operand in a second operand buffer;
- generating a first characteristic signal representative of the first status; and
- generating a second characteristic signal representative of the second status.

16. The method for providing a floating point remainder of claim 15, wherein the first characteristic signal and the second characteristic signal are generated without regard to memory storage external to the first operand buffer and the second operand buffer.

17. The method for providing a floating point remainder of claim 16, wherein the memory storage external to the first operand buffer and the second operand buffer is a floating point status register.

18. The method for providing a floating point remainder of claim 14, wherein the asserting stage further comprises:
- producing the remainder of the first floating point operand and the second floating point operand; and
- asserting the resulting floating point operand.

19. The method for providing a floating point remainder of claim 14, wherein the first status, the second status, and the resulting status are each one of the following: an invalid operation status, an overflow status, an underflow status, a division by zero status, an infinity status, and an inexact status.

20. The method for providing a floating point remainder of claim 19, wherein the overflow status represents one in a group of a plus overflow (+OV) status and a minus overflow (−OV) status.

21. The method for providing a floating point remainder of claim 20, wherein the overflow status is represented as a predetermined non-infinity numerical value.

22. The method for providing a floating point remainder of claim 19, wherein the underflow status represents one in a group of a plus underflow (+UN) status and a minus underflow (−UN) status.

23. The method for providing a floating point remainder of claim 22, wherein the underflow status is represented as a predetermined non-zero numerical value.

24. The method for providing a floating point remainder of claim 19, wherein the invalid status represents a not-a-number (NaN) status due to an invalid operation.

25. The method for providing a floating point remainder of claim 19, wherein the infinity status represents one in a group of a positive infinity status and a negative infinity status.

26. A computer-readable medium on which is stored a set of instructions for providing a floating point remainder, which when executed perform stages comprising:
- determining a first status of a first floating point operand and a second status of a second floating point operand based upon data within the first floating point operand and data within the second floating point operand respectively; and
- asserting a resulting floating point operand containing the remainder of the first floating point operand and the second floating point operand and a resulting status embedded with the resulting floating point operand.

27. The computer-readable medium of claim 26, wherein the determining stage further comprises:
- storing the first floating point operand in a first operand buffer;
- storing the second floating point operand in a second operand buffer;
- generating a first characteristic signal representative of the first status; and
- generating a second characteristic signal representative of the second status.

28. The computer-readable medium of claim 27, wherein the first characteristic signal and the second characteristic signal are generated without regard to memory storage external to the first operand buffer and the second operand buffer.

29. The computer-readable medium of claim 28, wherein the memory storage external to the first operand buffer and the second operand buffer is a floating point status register.

30. The computer-readable medium of claim 26, wherein the asserting stage further comprises:
    producing the remainder of the first floating point operand and the second floating point operand; and
    asserting the resulting floating point operand.

31. The computer-readable medium of claim 26, wherein the first status, the second status, and the resulting status are each one of the following: an invalid operation status, an overflow status, an under flow status, a division by zero status, an infinity status, and an inexact status.

32. The computer-readable medium of claim 31, wherein the overflow status represents one in a group of a plus overflow (+OV) status and a minus overflow (−OV) status.

33. The computer-readable medium of claim 32, wherein the overflow status is represented as a predetermined non-infinity numerical value.

34. The computer-readable medium of claim 31, wherein the underflow status represents one in a group of a plus underflow (+UN) status and a minus underflow (−UN) status.

35. The computer-readable medium of claim 34, wherein the underflow status is represented as a predetermined non-zero numerical value.

36. The computer-readable medium of claim 31, wherein the invalid status represents a not-a-number (NaN) status due to an invalid operation.

37. The computer-readable medium of claim 31, wherein the infinity status represents one in a group of a positive infinity status and a negative infinity status.

* * * * *